July 23, 1957     H. MERSHEIMER     2,800,359
FORWARD END OF A SELF-SUPPORTING VEHICLE BODY Filed Sept. 23, 1953     2 Sheets-Sheet 1

Inventor
Hans Mersheimer
By J.E. Jones
Attorney

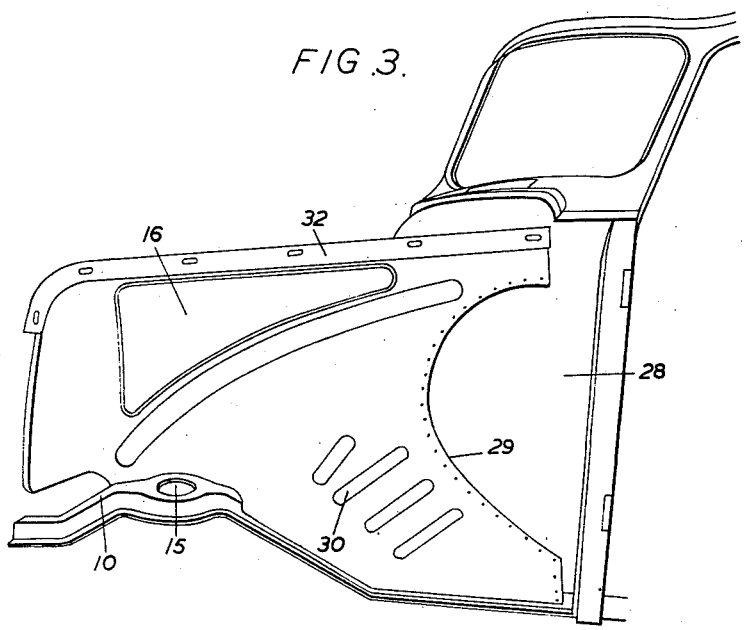

United States Patent Office 2,800,359
Patented July 23, 1957

2,800,359

FORWARD END OF A SELF-SUPPORTING VEHICLE BODY

Hans Mersheimer, Russelsheim am Main, Germany, assignor to General Motors Corporation, Detroit, Mich., a corporation of Delaware Application September 23, 1953, Serial No. 381,940

Claims priority, application Germany October 25, 1952

6 Claims. (Cl. 296—28)

This invention relates to the forward end of a self-supporting vehicle body. Generally, in series production of such bodies, the forward end constitutes a structural group by itself and it is only during the final coachwork assembly that it is united, along with other structural groups such as the central body portion, the rear portion or the like, to form a complete and inseparable superstructure or framework for the vehicle. The forward end of such a vehicle body may consist of two longitudinal members to which the front-wheel assembly, for example a pre-assembled front axle unit, may be later secured. Wheel cases for the front wheels may be welded over their entire length on the longitudinal side members and these wheel cases transmit the forces from the front axle, by means of stays, to a front partition closing off the passenger space.

The wings may be secured to the upper edges of the wheel cases, but generally in connection with a self-supporting vehicle body the wings do not transmit any appreciable forces.

Finally, the front ends of the side members are joined together by a cross-member to which parts of the front casing of the radiator are attached.

The present invention aims at improving these known constructions and in providing a structural unit which is particularly strong and resistant when the vehicle is on the road, is nevertheless as light as possible, and yet at the same time admits of economical series production.

The invention attains this by arranging that at the front ends the wheel cases are securely joined together by an upper and a lower connecting plate extending over the width of the vehicle. The front ends of the wings may be secured to both connecting plates.

By fitting the two connecting plates one above the other a particularly rigid front end to the vehicle body is provided.

At the same time, according to the invention, the connecting plates are formed as guide plates for the cooling air to ensure that the air flows efficiently towards the radiator situated behind the connecting plates.

Further features and details of the invention will be gathered from the following description, with reference to the accompanying drawings of a preferred embodiment of the invention, which embodiment is by way of example only:

Figure 1:
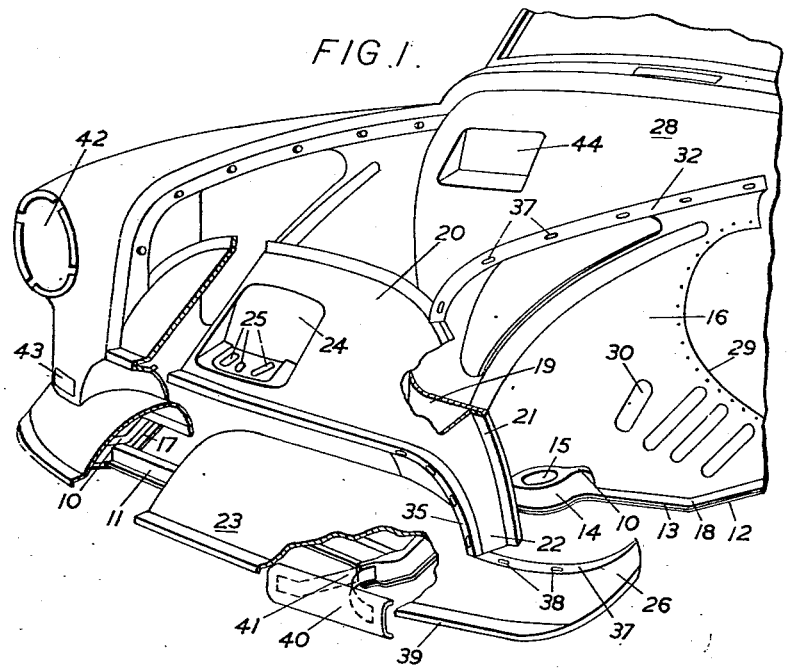
Figure 1 shows the spatial arrangement of the forward end of the vehicle body, the left-hand wing and the engine bonnet being omitted.

Figure 3 gives a side elevation of the forward end of the body according to Figure 1 but with the connecting plates omitted.

In Figure 1, 10 denotes the longitudinal side members of the forward end of the vehicle body. At their front ends they are joined together by the cross-member 11. Both members are made of downwardly open U-shaped pressings and are closed to form box-shaped profiles by cover plates 12 which are secured along flanges 13, bent at right angles, of the side members 10. The extensions 14 of the side members 10 with the oval openings 15 make it possible for parts of a front axle springing system (not shown), for example the helical springs and the telescopic shock absorbers, to be passed through.

The plates 16 of the wheel cases are welded over their entire length to the side members 10. They are welded at the insides 17 of the side members in the region of the extensions 14 but otherwise at the outsides 18.

This results in an advantageous arrangement for mounting and dismantling the front axle assembly (not shown) whilst parts of the front wheel springing which have to be re-adjusted or overhauled from time to time are easily accessible. At the same time this alternate attachment of the wheel case plates 16 to the side members 10 ensures a particularly stiff and rigid union. The front ends 19 of the wheel cases 16 are bent over outwardly towards the sides of the vehicle and are welded to the upper connecting plate 20 along the flange 21. In the region of the centre line of the vehicle, the upper connecting plate 20 is shaped rising obliquely backwards whilst its ends 22 are bent laterally downwards and abut with the lower connecting plate 23 and are securely connected to same.

In the centre, the upper connecting plate 20 is provided with a trough-shaped recess 24 which serves to receive the fastener devices 25 for the engine bonnet (not shown). The lower connecting plate 23 extends over the entire width of the vehicle and in the central region it has an upwardly arched cross-section. The lateral ends 26 of the bottom connecting plate 23 are bent over backwards to correspond to the contour of the mud guard or wing 27. The two connecting plates 20 and 23 ensure that the forward end of the coachwork is held together in a particularly rigid manner with the result that inadmissible distortions of the body are diminished notwithstanding the light construction.

The configuration of the connecting plates provides a wide air intake aperture, through which the inflowing cooling air for the radiator (not shown) placed behind the connecting plates, is directed in such a way that better air-flow and air-resistance conditions are obtained for the vehicle than were attainable with known arrangements. Finally, the sheet metal pressings of relatively simple shape render possible a cheap manufacture and a rational assembly in series production. In the example shown, the connecting plates 20 and 23 are rigidly fitted into the union of the front end. However, one of the two connecting plates may be arranged pivotally, so as to obtain special advantages with regard to the cooling action and the flow resistance of the vehicle, without unduly weakening the rigid union of the forward end of the coachwork.

The plates 16 of the wheel case are rigidly joined at their rear ends to the front partition 28 of the vehicle body. This front partition 28 extends very far forwards so as to gain a considerable amount of room for the passenger space behind. The wheel case plate 16 and also the front partition 28 are made highly convex, looking from the interior of the engine space, and thus the welding seam 29 (Fig. 3) joining them runs in an arch-shape between these plates 16 and the front partition 28, with the result that the forces are transferred in a particularly efficient manner over a wide area from the central portion of the body into the forward end. Thus additional stays, supports and the like are not necessary.

The wheel case plates 16 may be considered as box girders open towards the sides of the vehicle, these acquiring sufficient stiffness simply by their shaping and by the nature of the above-described attachment to the front partition 28 and side member 10, as well as by corrugations 30 which are stamped in.

In contrast to the parts described so far, which are all fixedly joined together, for example by spot welding, the wings 27 are screwed or bolted on so that when damaged in traffic they can more easily be substituted by replacement wings.

Figure 2:
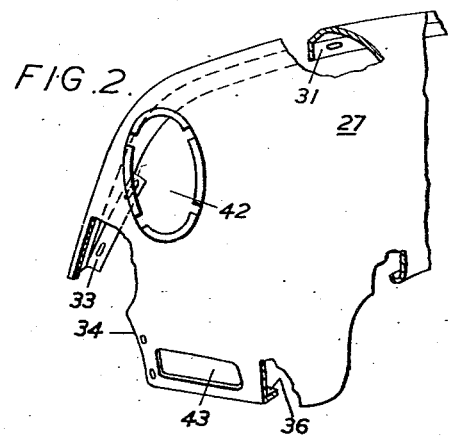
Figure 2 shows the left-hand wing omitted from Figure 1.

After assembly, the downwardly turned attachment flange 31 (Fig. 2) of the wing 27 rests against the upper flange 32 of the wheel case plate 16. In the vicinity of the upper connecting plate 20, it follows the obliquely and backwardly rising face and is secured to same through the flange 33. The edge 35 of the upper connecting plate 20 runs laterally downwards in an arc and the front arched edge 34 of a wing 27 covers it. Finally, the backwardly bent edge 36 of the wing 27 rests against the flange 37 of the lower connecting plate 23. All points of contact are provided with a sufficient number of holes 38 to enable the wing 27 to be bolted on. If desired however, the wings may also be welded on at the places indicated.

The front edge 39 of the lower connecting plate 23 is covered by the bumper 40. It is secured to the side members 10 at two places in well known manner by means of spring strips 41.

The circular openings 42 in the wing 27 are intended for the head lamps and the rectangular holes 43 for flashing lamps for direction-indicating.

The recess 44 in the front partition 28 serves to house an electric battery.

While the embodiments of the present invention as herein disclosed constitute preferred forms, it is to be understood that other forms might be adopted.

I claim:

1. Forward end structure of a self-sustaining vehicle body, comprising two longitudinal members each having near its front end mounting means for wheel suspension apparatus; two spaced wheel case plates each having its bottom edge welded along its entire length to one of said members, the forward part of said bottom edge adjacent said mounting means being secured to that side of the longitudinal member which faces inwardly towards the longitudinal axis of the vehicle to accommodate said suspension apparatus, while the rear part of said bottom edge is secured to the outwardly facing side of said member; two transverse connecting plates namely an upper and a lower plate, each extending substantially across the entire width of the vehicle and welded to said wheel case plates and being so shaped and arranged as to provide between the connecting plates an air inlet opening; and a transverse body partition at the rear of the wheel case plates, said partition being welded to each of said wheel case plates.

2. Forward end structure of a self-sustaining vehicle body, comprising two longitudinal members each having near its front end mounting means for wheel suspension apparatus; two spaced wheel case plates each having its bottom edge welded to one of said members, the forward part of said bottom edge adjacent said mounting means being welded to that side of the longitudinal member which faces inwardly towards the longitudinal axis of the vehicle to accommodate said suspension apparatus, while the rear part of said bottom edge is welded to the outwardly facing side of said member, each wheel case plate being substantially convex as viewed from between the plates; two transverse connecting plates, namely an upper and a lower plate, each extending substantially across the entire width of the vehicle and welded to said wheel case plates and being so shaped and arranged as to provide between the connecting plates an air inlet opening; and a transverse body partition at the rear of the wheel case plates, said partition being substantially convex as viewed from between the wheel case plates and being welded to each of said wheel case plates.

3. Forward end structure of a self-sustaining vehicle body, comprising two longitudinal members each having near its front end mounting means including an opening for mounting wheel suspension apparatus; two spaced wheel case plates each having its bottom edge welded along its entire length to one of said members, the forward part of said bottom edge adjacent said opening being welded to that side of the longitudinal member which faces inwardly towards the longitudinal axis of the vehicle to accommodate said suspension apparatus, while the rear part of said bottom edge is welded to the outwardly facing side of said member, each wheel case plate being substantially convex as viewed from between said plates; two transverse connecting plates, namely an upper and a lower plate, each extending substantially across the entire width of the vehicle and welded to said wheel case plates and being so shaped and arranged as to provide between the connecting plates an air inlet opening; a transverse body partition at the rear of the wheel case plates, said partition being substantially convex as viewed from between the wheel case plates and being welded to each of said wheel case plates; and wings of which the upper edges are attached to said wheel cases and the front edges are attached to said transverse connecting plates.

4. A forward end structure of a self-sustaining vehicle body, comprising two longitudinal frame beam members, two spaced wheel case plates, each having its bottom edge connected to one of said longitudinal members, and each being substantially convex as viewed from between said plates, two transverse connecting plates, namely, an upper and a lower plate, each extending substantially across the entire width of the vehicle and being connected to said wheel case plates and being so shaped and arranged as to provide between the connecting plates an air inlet opening, the upper connecting plate having downwardly extending end portions each of which is connected to the forward end of one of said case plates, and a transverse body partition at the rear of the wheel case plates, said partition being substantially convex as viewed from between the wheel case plates and being connected to each of said wheel case plates.

5. A forward end structure of a self-sustaining vehicle body, comprising two longitudinal frame beam members, two spaced wheel case plates, each having its bottom edge connected to one of said longitudinal members, and each being substantially convex as viewed from between said plates, two transverse connecting plates, namely an upper and a lower plate, each extending substantially across the entire width of the vehicle and being connected to said wheel case plates and being so shaped and arranged as to provide between the connecting plates an air inlet opening, the upper connecting plate having downwardly extending end portions each of which is connected to the forward end of one of said case plates, the lower connecting plate constituting a cross-member between the said longitudinal members; and a transverse body partition at the rear of the wheel case plates, said partition being substantially convex as viewed from between the wheel case plates and being connected to each of said wheel case plates.

6. A forward end structure of a self-sustaining vehicle body, comprising two longitudinal frame beam members, two spaced wheel case plates, each having its bottom edge connected to one of said longitudinal members, and each being substantially convex as viewed from between said plates, two transverse connecting plates, namely an upper and a lower plate, each extending substantially across the entire width of the vehicle and being connected to said wheel case plates and being so shaped and arranged as to provide between the connecting plates an air inlet opening, the upper connecting plate having downwardly extending end portions each of which is connected to the forward end of one of said case plates, the lower connecting plate constituting a cross-member between said longitudinal members, and being of upwardly arched transverse cross-section, and a transverse body partition at the rear of the wheel case plates, said partition being substantially convex as viewed from between the wheel case plates and being connected to each of said wheel case plates.

References Cited in the file of this patent

UNITED STATES PATENTS

| | | |
|---|---|---|
| 2,193,229 | Exner | Mar. 12, 1940 |
| 2,250,654 | Saives | July 29, 1941 |
| 2,358,486 | Zeeb | Sept. 19, 1944 |
| 2,606,625 | Paton | Aug. 12, 1952 |
| 2,627,426 | Toncray et al. | Feb. 3, 1953 |
| 2,637,592 | Karlby | May 5, 1953 |

FOREIGN PATENTS

| | | |
|---|---|---|
| 436,639 | Great Britain | Oct. 15, 1935 |